UNITED STATES PATENT OFFICE.

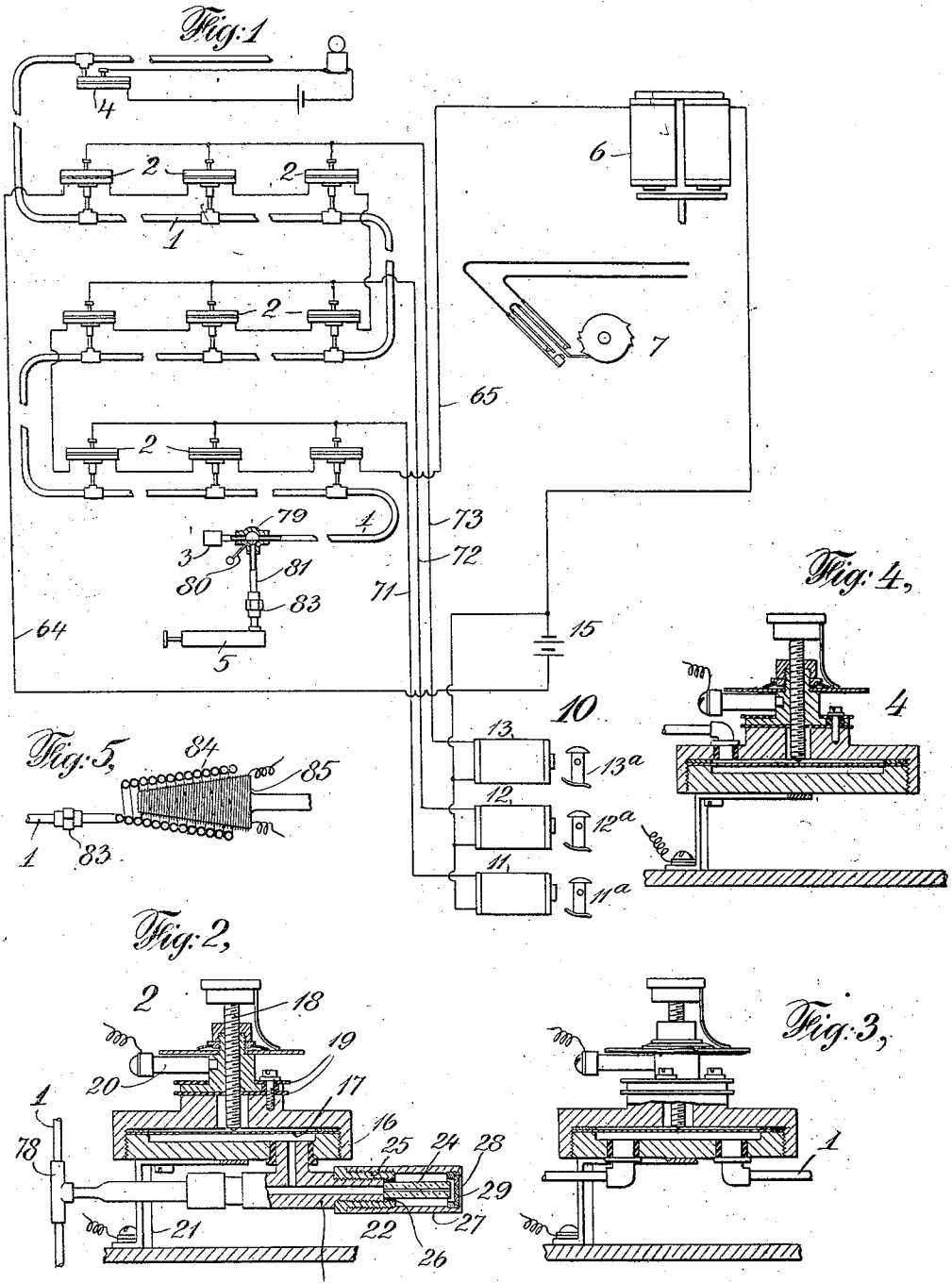

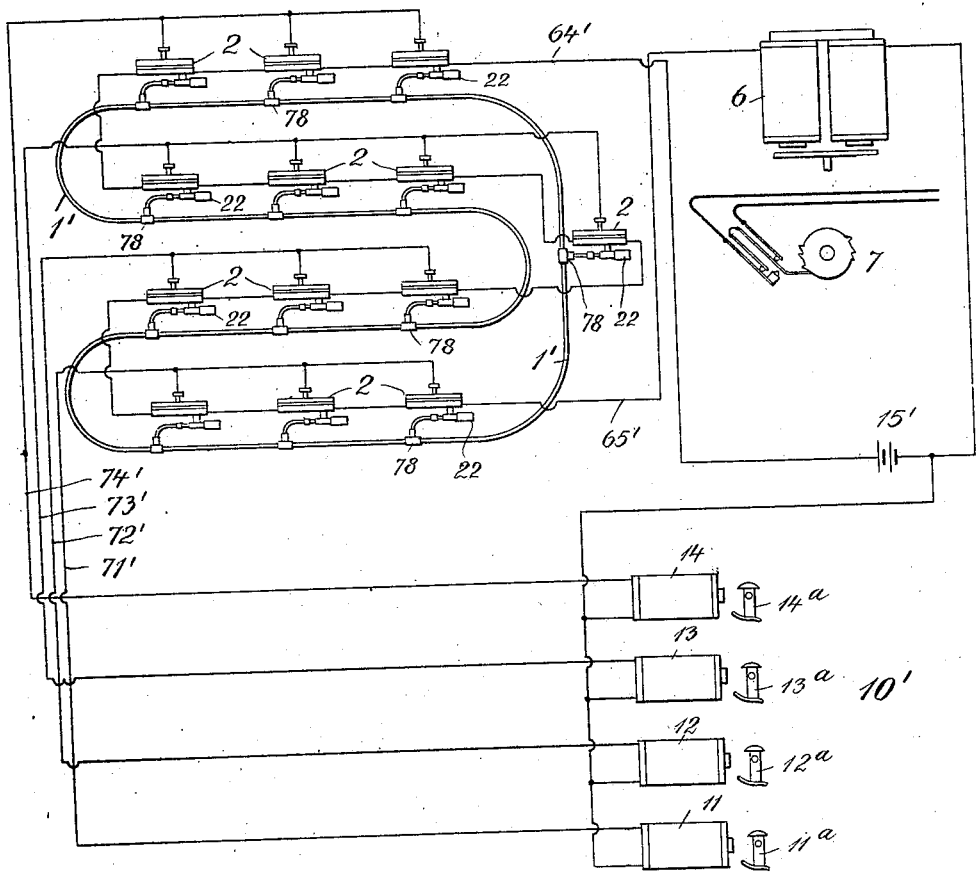

JAMES G. NOLEN, OF NEW YORK, N. Y., ASSIGNOR TO FIRE PROTECTION DEVELOPMENT COMPANY, OF NEW YORK, N. Y., A CORPORATION OF MAINE.

SUPERVISORY ALARM SYSTEM.

1,082,702.

Specification of Letters Patent.

Patented Dec. 30, 1913.

Application filed August 1, 1912. Serial No. 712,765.

*To all whom it may concern:*

Be it known that I, JAMES G. NOLEN, a citizen of the United States of America, and a resident of New York, in the county of New York and State of New York, have invented certain new and useful Improvements in Supervisory Alarm Systems, of which the following is a specification.

My invention relates to improvements in supervisory alarm systems such as are employed for indicating sudden and excessive rise in temperatures, and relates particularly to electro-pneumatic systems, of the class referred to. Such systems comprise piping of small bore, laid through the space to be protected or supervised, and connected to fluid-pressure-actuated alarm-initiating devices, which latter devices are arranged to be actuated by expansion of air in the piping, caused by sudden rise of temperature; which pressure-actuated alarm-initiating devices may themselves indicate the alarm, or may be electric contact devices adapted when actuated to transmit an alarm through an electric circuit, or to set in operation other transmitting means; or these fluid-pressure-actuated alarm-initiating devices may operate to effect indication of abnormal conditions, or to effect the transmission of a signal, in various other ways. In such systems, since the alarm initiating device should not be operated by slow rise of temperature, such as may be occasioned by natural causes, and may extend through a wide range, it is customary to provide an escape vent through which air will escape slowly, but with sufficient rapidity to prevent the signal-initiating device being actuated by slow rise of temperature, but which will not permit escape of air at such rate as to prevent actuation of the signal-initiating device when the temperature rises rapidly. Heretofore one diaphragm contact device has commonly been employed for each length of piping, or "detector tubing," as it is commonly called; such diaphragm being located at one end of the length of detector tubing, the other end of such tubing being closed; or, the detector tubing has been arranged in the form of a loop, both ends of which are connected to the diaphragm contact device, as in the patent to J. E. Shepherd, No. 884,047, dated April 7, 1908, and in my application Sr. No. 509,103, filed August 23, 1909, though in some cases two diaphragm contact devices have been employed located respectively at the two ends of a loop of detector tubing.

According to the present invention, instead of locating the diaphragm contact devices, or "detectors," as they are commonly termed, at the end or ends of a length of detector tubing, I locate a plurality of pneumatic contact devices or detectors at various points intermediate the ends of a length of detector tubing, spacing such detectors suitable distances apart along such tubing, and by preference connecting such detectors electrically to the same signal transmitting device, and also connecting them, preferably in groups, to suitable annunciating devices. In the case of a building or "risk" comprising several rooms, or several floors, one length of detector tubing may pass through a number of rooms or number of floors; and in each room or each floor, there may be a plurality of detectors connected at intervals to that one detector tubing; the detectors of each room, or floor, then constituting a group; and in such cases the detectors of each group are commonly connected electrically to a single annunciating device common to that group, the detectors of all the groups being connected to a common alarm transmitting device. In many cases, with pneumatic alarm initiating devices or detectors so located on a single length of tubing, it is unnecessary to provide the individual detectors with vents; the ends of the tubing being open, in case the tubing extends for a considerable distance beyond the extreme detectors, or one or both ends of the tubing being otherwise provided with restricted escape means in case the tubing does not extend a considerable distance beyond one or both extreme detectors; but in the case of a very long length of tubing having a large number of detectors connected to it, one or more restricted escape means may be provided at an intermediate point or points of the detector tubing, such restricted escape means being, in such case, preferably on one or more of the detectors themselves.

The system embodying the invention of this application has the important advantage over systems wherein the detectors are located at the end or ends of the detector tubing, that ordinarily a plurality of detectors will be operated by any fire, the detector nearest the point of inception of the fire being, ordinarily, first operated, and then the detectors on opposite sides of such first detector being operated, and so on. Possible failure of the first detector to operate makes very little difference, therefore, as to the sending of the alarm, as several detectors on opposite sides of the detector nearest the point of inception of fire will be operated almost immediately thereafter. The operation of any one of these detectors will effect the sending of an alarm. The annunciator of the system will indicate the room or floor in which the fire began.

The system herein described has numerous other advantages, among which are that an alarm is obtained more promptly than when the detectors are located at the end or ends only of the tubing, owing to at least one detector being closer to the point of inception of the fire than is ordinarily possible when the detectors are located at the ends only of the tubing; and that the system is much more easily tested for continuity of tubing, and for operativeness of all of the detectors.

The objects of my invention are to improve and simplify pneumatic alarm systems such as referred to, to increase the reliability and efficiency thereof, to render the same more prompt in response to fires, and more certain of response, and to facilitate testing of the tubing, and of the detectors.

I will now proceed to describe my invention with reference to the accompanying drawings, and will then point out the novel features in claims.

In the drawings: Figure 1 is a diagram illustrating the arrangement of a plurality of detectors upon a single length of tubing, and illustrating schematically only, alarm transmitting and annunciating devices. Fig. 2 shows a detail vertical section of one form of pneumatic diaphragm or detector, such as may be employed, and illustrates one method of connection of the detector tubing thereto. Fig. 3 is a view similar to Fig. 2, illustrating a further method of connection of the detector tubing to the alarm initiating device. Fig. 4 shows a vertical section of the suction detector or contact device 4. Fig. 5 is a view illustrating more or less diagrammatically and in section, a heat-coil testing device which may be employed. Fig. 6 is a view similar to Fig. 1, except that the tubing employed is endless.

Referring first to Fig. 1, numeral 1 designates a length of detector tubing to which are connected a plurality of detectors 2. I have shown these detectors arranged in three groups of three each, and it may be understood that each group is located in a single room or floor of the risk, the different groups being located in different rooms or on different floors of the risk, the one length of detector tubing extending throughout the risk. At one end of the length of detector tubing I have illustrated a restricted escape means 3; and I have indicated that the other end of the detector tubing extends an indefinite distance beyond the last detector, that distance being such that no other restricted escape means is required at that end of the detector tubing, the extension of the tubing itself in this case constituting a restricted escape means. I have further indicated, beyond one of the extreme detectors, a special suction contact device 4 employed for testing purposes; and I have further indicated beyond the other extreme detector a connection for a suction pump 5 to be employed for testing purposes.

6 designates the controlling magnet of an alarm transmitting device, and 7 the alarm wheel or break wheel of such alarm transmitting device. I do not in this application illustrate the alarm transmitter and the circuits thereof in full; the same being illustrated in full in a companion application filed August 1, 1912 Sr. No. 712,764. For the purpose of the present case, the alarm transmitter may be any transmitter which will be operated by the operation of any one of the detectors 2. For present purposes, the transmitter may be understood to be one which is operated upon the closing of contact between the diaphragm and contact screw of any one of the detectors 2.

Numeral 10 designates an annunciator of the system, comprising, in the instance shown, three drop magnets 11, 12 and 13, with corresponding magnetically-operated drops or shutters 11ª, 12ª and 13ª respectively.

15 designates a battery or generator supplying current to the circuits whereby the several detectors control the magnet 6 of the alarm transmitter. For present purposes, it may be assumed that the said circuit is from battery 15 through wire 64 to the bases of the several detectors 2, in series, and thence through 65 to the coils of magnet 6, and thence back to battery; and it may be assumed that the detectors 2 control magnet 6, in that each detector, when operated, will complete a "shunt" from wire 64, through its diaphragm and contact screw, to a wire 71, or 72 or 73, as the case may be, to the corresponding annunciator magnet, 11 or 12 or 13, as the case may be, back to battery, the said "shunt" so completed omitting the transmitter magnet 6. The annunciator magnets will be of much less resistance than the transmitter magnets; and hence the completion of a "shunt" as described, has the effect of deënergizing the transmitter magnet 6.

Referring now to Fig. 2, 16 designates the casing of one of the diaphragm contact devices or detectors, 17 designates the diaphragm thereof; 18 the contact screw thereof, insulated from the case 16 by insulating material 19, and 20 a binding post for the electric connection of a circuit conductor to the contact screw 18. 21 designates a bracket or other means by which the detector may be connected to a wall or ceiling or other suitable support, this bracket being in electrical connection with the case 16; and a circuit conductor is commonly connected to this bracket 21, one of the screws by which the bracket is secured to the wall or other supports serving as a binding screw; the circuit conductor so connected to the bracket being therefore electrically connected to the diaphragm 17. 22 designates a restricted escape means such as may be provided in connection with the diaphragm contact device, said restricted escape means comprising a pipe nipple 23, connected to the case 16, beneath the diaphragm 17; and a short length of fine tubing, preferably glass thermometer tubing, 24, secured to the end of the nipple 23 by means of a sleeve screw 25 screwing upon the nipple 23, the glass tubing 24 being sealed in place by means of plastic sealing material 26; 27 designates a cover, screwing upon sleeve screw 25, and having at its end an opening 28 to the external air; suitable foraminous material 29 being usually provided, between the end of the glass tube 24 and this opening 28, to prevent dust entering tube 24, without materially retarding the escape of air through said tubing. I have found that a short glass tube of small diameter of bore, such as the tube 24, is a particularly efficient restricted escape means. It is not affected by exposure to air or other gases, since it is not oxidizable and is practically inert, chemically; it is not affected by prolonged exposure to temperatures approaching those at which combustion usually occurs; it is not affected by moisture; and since the diameter of its bore (usually about five-thousandths of an inch) is less than that of average dust grains, it is not affected by dust. Furthermore, such an escape means will serve lengths of pipe varying greatly in length. It is ordinarily required that no alarm shall be sent when the temperature rises at a rate no more rapidly than four degrees per minute, but that an alarm shall be given if the temperature rises at a greater rate. I have found that a glass tube of the bore referred to will serve detector tubing of about or less than .053 in. internal diameter, varying in length from fifty to nine hundred feet. For greater variations in length of detector tubing the length of the glass tube 24 may be varied.

The restricted escape means 3 shown in Fig. 1 as connected to the end of the detector tubing 1, may be precisely similar in construction to the restricted escape device 22 shown in Fig. 2.

The detector tubing may be connected to the diaphragm contact device 2 in various ways. In Fig. 2 I show the detector tubing connected to a contact device 2 by means of a T-connection 78; in Fig. 3 I show the diaphragm chamber connected directly to the detector tubing 1. For testing the continuity of the tubing it is convenient to provide beyond one of the extreme detectors 2, a suction contact device 4, and to provide, beyond the other extreme detector 2, a connection for a suction pump 5. The suction contact device 4, shown in section in Fig. 4, is in general construction the same as the detectors 2, except that the tubing 1 is connected to the upper side of the diaphragm chamber, instead of to the lower side thereof. For the convenient connection of the suction pump 5, I commonly provide a three-way valve 79 having a gravitating handle 80, so arranged that normally the branch pipe 81 leading to the suction pump is shut off from the tubing 1, said tubing 1 being open to the end; while when the handle of said valve is raised the detector tubing 1 is connected to the suction pump and connection to the open end of the tubing is shut off. If the tubing be intact, two or three strokes of the suction pump will create suction enough in the tubing to operate the suction contact device 4 at the opposite end of the system; the operation of this suction contact device being indicated by the ringing of a bell 82, which bell may be in any convenient location.

Ordinarily, the suction pump 5 will not be a permanent part of the system, but will be connected thereto, when the system is to be tested, by means of a pipe union connection 83, or other convenient coupling.

If a pressure pump be substituted for the suction pump, the operation of the various detectors may be proved; in most cases, instead of employing a pressure pump for proving the operativeness of the detectors 2, a testing device, such as is shown in Fig. 5, and comprising a coil of tubing 84 similar to the detector tubing, wound about an electric heater 85, is employed; such tubing 84 being connected to the tubing 1 at the union 83. The expansion of air in coil 84, when current is passed through the heater, is communicated to the tubing 1, when the handle of the valve 19 is raised.

The fact that the tubing 1 is open at the end, beyond the suction contact device 4, does not prevent the testing of the system by suction; for if the tubing extend for a number of feet (say fifteen or more feet) beyond such suction contact device, the resistance offered by such length of tubing beyond the contact device 4, to the flow of air, is sufficient to restrict the inflow of air and to cause the suction device 4 to operate when the suction pump is operated. Instead of extending the tubing 1 a number of feet beyond the end of the suction contact device 4, a restricted escape device, such as 22, may be provided; the resistance offered by this device 22 to the inflow of air being sufficient to restrict the inflow of air and to cause the suction contact device to operate when the suction pump is operated.

Since in this system the tubing is provided with restricted escape means to the atmosphere either at the ends of the tubing, or at intermediate points, or at both the ends and at intermediate points, no false alarms can occur through expansion of air in the tubing due to ordinary atmospheric temperature changes. The prolonged open ends of the tubing, or the vents 22 on the detectors, permit the pressure within the tubing to be always the same as that of the external air, except when a fire occurs, since atmospheric temperature changes are necessarily slow, as compared with temperature changes due to the occurrence of a fire. If, for any reason, it be preferred to close the ends of the detector tubing, then the diaphragm contact devices will be provided with restricted escape means 22, as shown for example, in Fig. 2, which restricted escape means permit inflow as well as outflow of air, so that except in the case of abnormal expansion of the air due to the occurrence of a fire, the pressure within the tubing will be the same as that of the surrounding air.

The operation of the system is as follows: In case an abnormal temperature rise occurs in the vicinity of any portion of the tubing, the resulting expansion of the air in such portion of the tubing causes the operation of the nearest detector or detectors, with resulting closing of contact between the diaphragm and contact screw of that detector or detectors; and the closing of such contact completes a "shunt" across the terminals of the transmitter magnet 6, deënergizing said magnet and so setting the transmitter in operation. As the wave of air, due to the abnormal rise in temperature, spreads in both directions through the tubing 1, other detectors will be operated, so that in the event of the possible failure of the first operated detector or detectors to close circuit, other detectors, operated almost immediately thereafter, will close circuit, so that unless all of the detectors of the system are inoperative, or unless all of the wires leading from the detectors to the annunciator are broken, or unless the wire 64 leading from the battery to the detectors is broken, an alarm will surely result. All of the detectors of the system are therefore available for the transmission of an alarm due to excessive rise in temperature occurring in any portion of the system, since the wave of air spreads in both directions of the tubing, and after operating the detectors of the group nearest the point of origin of the fire, will operate the detectors of other groups to the very end of the system. That all of the annunciators are thus finally operated is not material, because, in most cases, the firemen will arrive before all of the groups of detectors have been operated, and the middle annunciator drop of those drops which have been moved to display position, will be, ordinarily, a drop connected to a group of detectors at or near the point of origin of the fire.

In this application I have not illustrated in full the transmitting circuits which I prefer to use. In my companion application Sr. No. 712,764 I have illustrated transmitter circuits such that battery circuits are always under test, and such that even if the wire 64 should be broken before the beginning of the alarm, current for the operation of the system will be received through wire 65.

As illustrated particularly in Fig. 6, the tubing may be arranged as an endless loop or length of tubing. In this figure, 1' designates such endless loop or length of tubing. And 71—74' designate the several annunciator wires leading from the several groups of detectors 2, to the several annunciator magnets. It will be clear that the operation of this system is the same as that shown in Fig. 1. From this figure and the other figures of the case it will be clear that the length of tubing provided with restricted escape means to the atmosphere, as that term is used herein and in the following claims, denotes a length of tubing provided with a restricted opening to the atmosphere at one or more points; but this tubing may be open at the ends when the ends extend an appreciable distance beyond the last testing device, or may be closed at the ends and provided with restricted escape means at some other point or points, or may be endless and provided with restricted escape means at one or more points.

What I claim is:—

1. A temperature-alarm apparatus comprising a length of tubing containing air at atmospheric pressure and provided with restricted escape means to the atmosphere and adapted to be exposed to the heat of a fire, and a plurality of fluid-pressure-actuated alarm-initiating devices connected to said tubing at various points along the length of the same and intermediate the ends thereof.

2. A temperature-alarm apparatus comprising a length of tubing containing air at atmospheric pressure and provided with restricted escape means to the atmosphere and adapted to be exposed to the heat of a fire, and a plurality of fluid-pressure-actuated alarm-initiating devices connected to said tubing at various points along the length of the same and intermediate the ends thereof, and means adapted to be actuated by said alarm-initiating devices for indicating abnormal rise of temperature.

3. A temperature-alarm apparatus comprising a length of tubing containing air at atmospheric pressure and provided with restricted escape means to the atmosphere and adapted to be exposed to the heat of a fire, and a plurality of fluid-pressure-actuated alarm-initiating devices connected to said tubing at various points along the length of the same and intermediate the ends thereof, and alarm-giving means controlled by said signal initiating devices.

4. A temperature-alarm apparatus comprising a length of tubing containing air at atmospheric pressure and provided with restricted escape means to the atmosphere and adapted to be exposed to the heat of a fire, and a plurality of fluid-pressure-actuated alarm initiating devices connected to said tubing at various points along the length of the same and intermediate the ends thereof, and alarm-transmitting means controlled by said signal initiating devices.

5. A temperature-alarm apparatus comprising a length of tubing containing air at atmospheric pressure and provided with restricted escape means to the atmosphere and adapted to be exposed to the heat of a fire, and a plurality of fluid-pressure-actuated contact devices connected to said tubing at various points along the length of the same and intermediate the ends thereof, and arranged to be actuated by expansion of air in said tubing, an electric circuit controlled by said contact devices, and alarm-giving means actuated by said circuit.

6. A temperature-alarm apparatus comprising a length of tubing containing air at atmospheric pressure and adapted to be exposed to the heat of a fire, and a plurality of fluid-pressure-actuated alarm-initiating devices connected to said tubing at various points along the length of the same and intermediate the ends thereof, and restricted escape means connected to said tubing and arranged to permit flow of air into and out of said tubing to compensate for normal temperature changes.

7. A temperature-alarm apparatus comprising a length of tubing containing air at atmospheric temperature and adapted to be exposed to the heat of a fire, and a plurality of fluid-pressure-actuated alarm-initiating devices, connected to said tubing at various points along the length of the same and intermediate the ends thereof, and alarm-giving means controlled in common by said alarm-initiating devices, whereby in the event of a fire the alarm-initiating devices are actuated successively, beginning with the device or devices nearest the point at which heat first influences the air within said tube, and whereby, in event of failure of the first alarm-initiating device or devices to effect the operation of the alarm-giving means, the wave of air flowing through said tube will actuate other alarm initiating devices.

8. A temperature-alarm apparatus comprising a length of tubing containing air at atmospheric pressure and provided with restricted escape means to the atmosphere and adapted to be exposed to the heat of a fire, and a plurality of groups of fluid-pressure-actuated alarm-initiating devices, connected to said tubing at various points along the length of the same and intermediate the ends thereof, each such group comprising a plurality of alarm-initiating devices, separate annunciating means for each such group and controlled thereby, and alarm-giving means controlled in common by said alarm-initiating devices.

9. A temperature-alarm apparatus comprising a length of tubing containing air at atmospheric pressure and provided with restricted escape means to the atmosphere and adapted to be exposed to the heat of the fire, a plurality of fluid-pressure-actuated alarm-initiating devices connected to said tubing at various points along the length of the same and intermediate the ends thereof, a suction-operated testing device connected to said tubing beyond one of the extreme alarm-initiating devices, and suction producing means connected to the tubing beyond the other of the extreme alarm-initiating devices, and signaling means arranged to be operated by said suction operated device.

10. A temperature-alarm apparatus comprising a length of tubing containing air at atmospheric pressure and provided with restricted escape means to the atmosphere and adapted to be exposed to the heat of the fire, a plurality of fluid-pressure-actuated alarm-initiating devices connected to said tubing at various points along the length of the same and intermediate the ends thereof, a suction-operated testing device connected to said tubing beyond one of the extreme alarm-initiating devices, and suction producing means connected to the tubing beyond the other of the extreme alarm-initiating devices, signaling means arranged to be operated by said suction operated device, said tubing being open beyond the point of connection of the suction producing means thereto, and a valve arranged to connect such main portion of tubing to such suction producing means, or to the open portion of the tubing beyond the point of connection of the suction producing means, at will.

11. A temperature-alarm apparatus comprising a length of tubing containing air at atmospheric pressure and provided with restricted escape means to the atmosphere and adapted to be exposed to the heat of the fire, a plurality of fluid-pressure-actuated alarm-initiating devices connected to said tubing at various points along the length of the same and intermediate the ends thereof, a suction-operated device connected to said tubing beyond one of the extreme alarm-initiating devices, and suction producing means connected to the tubing beyond the other of the extreme alarm-initiating devices, signaling means arranged to be operated by said suction operated device, said tubing being open beyond the point of connection of the suction producing means thereto, and a valve arranged to connect such main portion of the tubing to such suction producing means, or to the open portion of the tubing beyond the point of connection of the suction producing means, at will, said valve having weighted operating means tending normally to hold the valve in position to connect the main portion of the tubing with the open portion thereof.

12. A temperature-alarm apparatus comprising a length of tubing containing air at atmospheric pressure and provided with restricted escape means to the atmosphere and adapted to be exposed to the heat of a fire, and three or more fluid-pressure-actuated alarm-initiating devices connected to said tubing at various points along the length of the same and distant from one another.

13. A temperature-alarm apparatus comprising a length of tubing containing air at atmospheric pressure and adapted to be exposed to the heat of a fire, and three or more fluid-pressure-actuated alarm-initiating devices connected to said tubing at various points along the length of the same and distant from one another, said tubing provided at one or more points with restricted escape means arranged to permit flow of air into and out of said tubing to compensate for normal temperature changes.

In testimony whereof I have signed this specification in the presence of two subscribing witnesses.

JAMES G. NOLEN.

Witnesses:
 H. M. MARBLE,
 D. A. DAVIES.